(12) United States Patent
Moyer

(10) Patent No.: US 6,775,727 B2
(45) Date of Patent: Aug. 10, 2004

(54) SYSTEM AND METHOD FOR CONTROLLING BUS ARBITRATION DURING CACHE MEMORY BURST CYCLES

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 543 days.

(21) Appl. No.: 09/888,278

(22) Filed: Jun. 23, 2001

(65) Prior Publication Data
US 2002/0199052 A1 Dec. 26, 2002

(51) Int. Cl.⁷ .................. G06F 13/362; G06F 13/28
(52) U.S. Cl. .................. 710/113; 710/35; 710/240; 710/241
(58) Field of Search .................. 710/35, 113–118, 710/240–244

(56) References Cited

U.S. PATENT DOCUMENTS

| | | | |
|---|---|---|---|
| 4,710,916 A | * 12/1987 | Amstutz et al. | 370/424 |
| 4,912,632 A | * 3/1990 | Gach et al. | 710/28 |
| 4,987,529 A | 1/1991 | Craft et al. | |
| 5,072,365 A | 12/1991 | Burgess et al. | 395/725 |
| 5,416,910 A | 5/1995 | Moyer et al. | 395/325 |
| 5,506,972 A | 4/1996 | Heath et al. | |
| 5,535,333 A | * 7/1996 | Allen et al. | 709/212 |
| 5,740,376 A | 4/1998 | Carson et al. | |
| 5,758,105 A | * 5/1998 | Kelley et al. | 710/113 |
| 5,822,758 A | * 10/1998 | Loper et al. | 711/130 |
| 5,889,973 A | 3/1999 | Moyer | 395/376 |
| 5,894,562 A | 4/1999 | Moyer | 395/293 |
| 5,944,800 A | * 8/1999 | Mattheis et al. | 710/23 |
| 6,088,751 A | * 7/2000 | Jaramillo | 710/116 |
| 6,330,646 B1 | * 12/2001 | Clohset et al. | 711/158 |
| 6,513,089 B1 | * 1/2003 | Hofmann et al. | 710/309 |
| 6,564,304 B1 | * 5/2003 | Van Hook et al. | 711/154 |
| 6,671,284 B1 | * 12/2003 | Yonge et al. | 370/462 |
| 6,687,821 B1 | * 2/2004 | Hady et al. | 713/100 |
| 2002/0062414 A1 | * 5/2002 | Hofmann et al. | 710/110 |

OTHER PUBLICATIONS

PCT/US02/18358 PCT Search Report mailed Nov. 19, 2002.
ARM Limited 1999, "AMBA Specification (Rev. 2.0)", Chapter 3; AMBA AHB, pp. 3–1–3–58.

* cited by examiner

Primary Examiner—Sumati Lefkowitz
Assistant Examiner—Trisha Vu
(74) Attorney, Agent, or Firm—Robert L. King; Susan C. Hill

(57) ABSTRACT

A bus arbiter (34) monitors characteristics associated with the type of information that is transferred via a global data bus (12) during burst transactions of information. A user-controlled arbitration policy register (56) may be programmed with values that are decoded to control whether interruption by a requesting bus master are permitted. Various factors can be used to determine interrupt permissions. Examples of such factors include the type of requesting device, whether a burst transaction is bounded or unbounded, whether a transaction is a read or a write of a system memory and the identity of the particular device requesting bus mastership.

16 Claims, 4 Drawing Sheets

| CONTROL FIELD ENCODING | |
|---|---|
| 0 0 0 | NO BUS OWNERSHIP CHANGE ALLOWED DURING CACHE BURST CYCLES |
| 0 0 1 | BUS OWNERSHIP CHANGE ALLOWED ONLY DURING INSTRUCTION CACHE BURST CYCLES OR UNBOUNDED BURST CYCLES |
| 0 1 0 | BUS OWNERSHIP CHANGE ALLOWED ONLY DURING DATA CACHE BURST READ CYCLES OR UNBOUNDED BURST CYCLES |
| 0 1 1 | BUS OWNERSHIP CHANGE ALLOWED ONLY DURING CACHE BURST READ CYCLES OR UNBOUNDED BURST CYCLES |
| 1 0 0 | BUS OWNERSHIP CHANGE ALLOWED ONLY DURING CACHE BURST WRITE CYCLES OR UNBOUNDED BURST CYCLES |
| 1 0 1 | BUS OWNERSHIP CHANGE ALLOWED ONLY DURING DATA CACHE BURST WRITE CYCLES OR INSTRUCTION CACHE BURST CYCLES OR UNBOUNDED BURST CYCLES |
| 1 1 0 | BUS OWNERSHIP CHANGE ALLOWED ONLY DURING DATA CACHE BURST CYCLES OR UNBOUNDED BURST CYCLES |
| 1 1 1 | TRANSFER OF BUS OWNERSHIP ALLOWED DURING ANY BURST CYCLES |

*FIG.5*

| CONTROL FIELD ENCODING | |
|---|---|
| 0 0 | NO BUS OWNERSHIP CHANGE ALLOWED DURING BURST CYCLES |
| 0 1 | NO BUS OWNERSHIP CHANGE ALLOWED DURING ACCESSES TO A BURST MODE DEVICE |
| 1 0 | NO BUS OWNERSHIP CHANGE ALLOWED DURING ACCESSES TO A FAST MEMORY DEVICE |
| 1 1 | TRANSFER OF BUS OWNERSHIP ALLOWED DURING ANY BURST CYCLES |

*FIG.6*

SYSTEM AND METHOD FOR CONTROLLING BUS ARBITRATION DURING CACHE MEMORY BURST CYCLES

RELATED APPLICATIONS

This application is related to co-pending patent application, U.S. Ser. No. 09/490,132 entitled "Flexible Interrupt Controller That Includes An Interrupt Force Register" filed on Jan. 24, 2000 and assigned to the same assignee as the present application.

This application is also related to patent application, U.S. Ser. No. 09/335,105, now U.S. Pat. No. 6,378,022, entitled "Method And Apparatus For Processing Interruptible Multi-Cycle Instructions" filed on Jun. 17, 1999 and assigned to the same assignee as the present application.

1. Field of the Invention

This invention relates generally to data processing systems, and more specifically, to arbitration of control of communication buses within data processing systems.

2. Background of the Invention

In data processing systems containing multiple communication bus masters, bus arbitration logic is used to select one of several requesting masters to obtain bus ownership. The selection of a bus master may be made using a number of known methods. Examples of existing algorithms used to implement a selection include implementing selection by round robin ordering, selection by fairness or selection by a strict assigned priority. In many data processing systems it is desired for one bus master to hold ownership of a global communication bus for the duration of a burst transfer associated with a cache memory line fill or copyback operation, without any interruption of bus ownership, in order to improve operating efficiency of the memory system. Typically, the global communication bus is dedicated to one bus master during such operations by providing some indication, such as a burst attribute, to an initial portion of the transfers being burst or communicated. Such attribute is acknowledged within the system and bus arbitration control circuitry prevents a re-allocation of communication bus ownership. Once bus mastership is obtained, the current bus master keeps bus ownership for the duration of the burst transfer.

Another technique used to maintain bus ownership is for the device in control of the bus to assert a bus lock signal. A disadvantage of this technique is that any other critical interrupt in the system is locked out from using the bus until the lock signal is relinquished. The use of special lock bits is one implementation previously used in connection with such a lock signal.

Other known systems specify that burst transfers are interruptible and require that an interrupted burst transfer be reinitiated by the interrupted bus master once bus ownership is regained. A disadvantage of such a technique is the interrupted bus master must rebuild the bus transfer sequence, thus lowering overall system efficiency and adding complexity to the bus protocol.

In some special circumstances the length of a cache memory line fill may exceed the maximum required latency of a time-critical alternate bus master. Although the frequency of occurrence for this type of interruption is generally low, such alternate bus masters may require immediate access to the bus. For such situations, it is critical that the current burst sequence be temporarily interrupted and then resumed although such interruption of an existing burst transfer will assuredly lower the efficiency of the memory system and the processor associated with the current burst transfer.

BRIEF DESCRIPTION OF THE DRAWINGS

The present invention is illustrated by way of example and is not limited by the accompanying figures, in which like references indicate similar elements.

FIG. 5 illustrates in table form an encoding of a control field of a control register illustrated in FIG. 4; and FIG. 6 illustrates in table form an alternate encoding of a control field of a control register illustrated in FIG. 4.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

For data processing systems requiring multiple communication bus masters, an improved bus ownership protocol is needed, particularly with respect to transferring bus mastership in systems utilizing burst transfers of information. In data processing systems containing multiple communication bus masters, bus arbitration logic is used to select one of several requesting masters to obtain bus ownership. The selection of a bus master may be made using a number of known methods. A prioritization scheme is one technique that is often implemented to determine what system resource will be given control of the bus. In many data processing systems once bus mastership is obtained, the current master holds ownership for the duration of the burst transfer.

Figure 1:
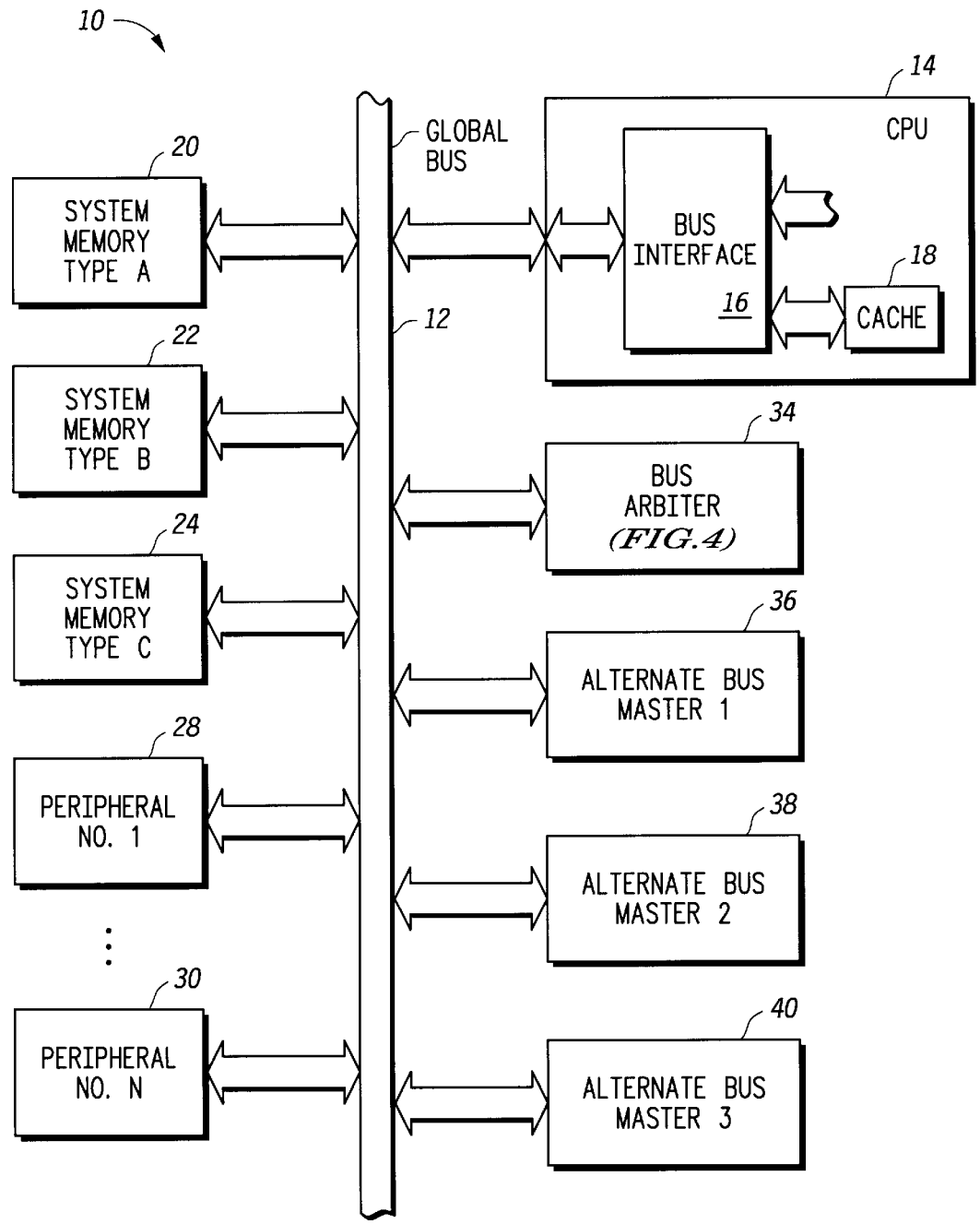
FIG. 1 illustrates in block diagram form an exemplary processing system for use with the present invention.

Illustrated in FIG. 1 is an exemplary Data Processing System 10 that requires bus arbitration. A Global Bus 12 is the center of communication within Data Processing System 10. Global Bus 12 has conductors (not shown) for communicating data, addresses and control information. A central processing unit or CPU 14 is connected to Global Bus 12. CPU 14 has a Bus Interface 16 that is connected to Global Bus 12 and to a Cache 18. Bus Interface 16 is also connected to all other circuitry (not shown) of CPU 14. A System Memory 20, a System Memory 22 and a System Memory 24 are each connected to Global Bus 12. Each of the system memories represents a different type of memory. System Memory 20 is designated as implementing a Type A, System Memory 22 is designated as implementing a Type B, and System Memory 24 is designated as implementing a Type C. Examples of types of memory include DRAM (Dynamic Random Access Memory), Flash, ROM (Read Only Memory) and SRAM (Static Random Access Memory). A predetermined number of peripheral devices are connected to Global Bus 12. A first peripheral device, Peripheral 28, is connected to Global Bus 12, and an Nth peripheral device, Peripheral 30, is connected to Global Bus 12. Peripherals 28 through 30 may be various types of peripherals, including a memory controller, a graphics controller, a display, a keyboard, etc. In the illustrated form N is a predetermined integer value. A Bus Arbiter 34 is connected to Global Bus 12. Additionally, another predetermined number of alternate bus masters is connected to Global Bus 12. In the illustrated form, an Alternate Bus Master 36, an Alternate Bus Master 38 and an Alternate Bus Master 40 are each connected to the Global Bus 12.

In operation, CPU 14 functions to operate with each of the peripherals, memories and the alternate bus masters to perform a predetermined system function or operation. Selected information required by System 10 and generated by System 10 is provided and stored by System Memories 20, 22 and 24. Since multiple operations are simultaneously being performed within System 10, Bus Arbiter 34 must function to control access to Global Bus 12. To minimize the need for CPU 14 to access the system memories, CPU 14 has internal Cache 18 that typically is significantly smaller in storage capacity than any of the system memories. Cache 18 may be a unified cache, holding both instructions and data, or may implement separate cache modules for holding instructions and data in different modules. Cache 18 typically holds copies of information from System Memory 20, System Memory 22 and System Memory 24. Cache 18 obtains information from and writes information back to System Memory 20, System Memory 22 and System Memory 24 using cache burst transfers. Cache burst transfers typically transfer a "block" or "line" of information consisting of multiple data words in a burst sequence via Global Bus 12. Many memories that are implemented within a data processing system communicate via burst transfers of information wherein the information is communicated in rapid, continual bursts.

Figure 2:
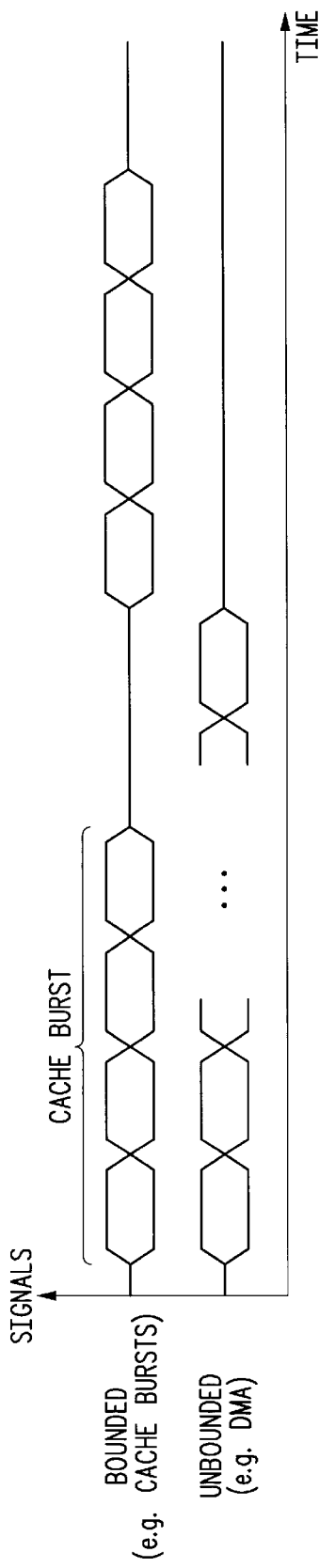
FIG. 2 illustrates in timing diagram form the characterizing format of both bounded and unbounded burst transfers.

Burst transfers may be categorized into two types: a bounded burst and an unbounded burst. Shown in timing diagram form in FIG. 2 is an example of the two types of burst transfers for explaining the difference between a bounded and an unbounded burst. Bounded bursts are typically associated with cache memories wherein a burst is of a fixed length and typically has a number of "beats" that is a power of two. For example, a cache that utilizes a line length of four words would perform a cache burst consisting of four beats with each beat corresponding to one of the four words. The bounded burst of FIG. 2 has four beats in each of the illustrated cache bursts. An example of an unbounded burst could involve an alternate bus master such as a Direct Memory Access (DMA) controller (DMAC) that is programmed to transfer an arbitrary number of information bytes or words. As illustrated by FIG. 2, the unbounded burst may be of varying length and therefore a bus arbiter cannot reliably predict when release of bus mastership by the DMA controller will occur.

Figure 3:
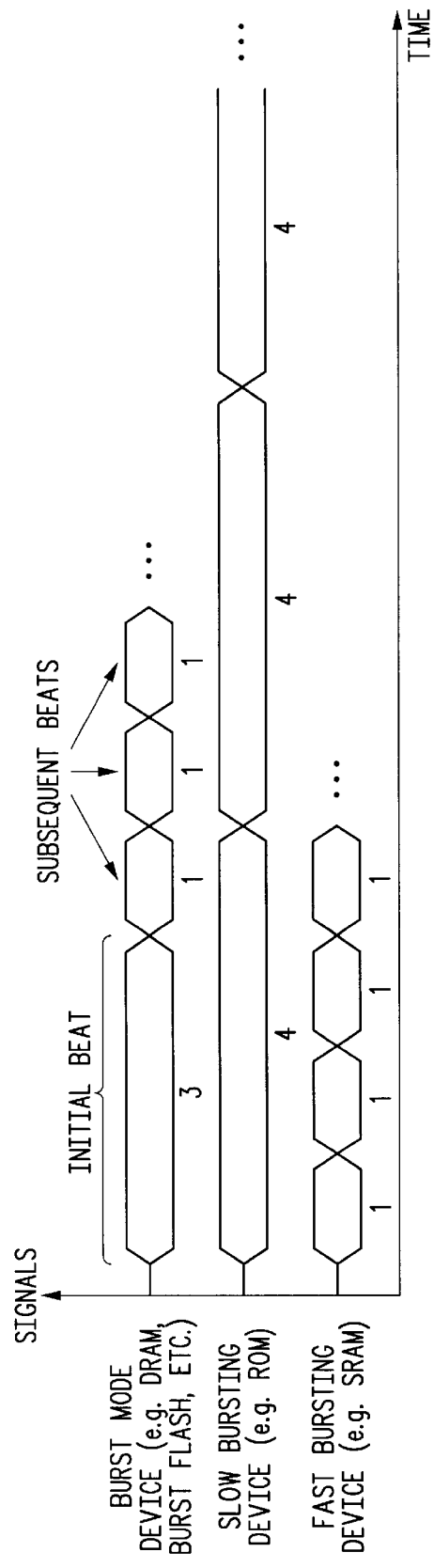
FIG. 3 illustrates in timing diagram form the characterizing format of information bursting associated with different types of memory devices.

FIG. 3 illustrates in timing diagram form a characterization of various types of memory devices that utilize burst transfers of information and are of different burst types. A burst mode device is shown as having an initial burst or beat that is longer in duration that subsequent immediately following beats. For example, the initial beat may be three clocks long and the subsequent beats may be one clock each in duration. The burst mode device may support either unbounded bursts, as shown, or bounded bursts. Examples of common burst mode devices include DRAMs and Flash memories. A slow bursting device is shown as having long (i.e. slow) continual beats of the same clock duration. As one example, each beat is shown as being four clock cycles in duration. Burst accesses to a slow bursting device may be either unbounded or bounded. An example of a common slow bursting device is a ROM. In contrast, a fast bursting device exhibits a continual stream of short beats of information. In the example of FIG. 3, each beat is shown as being only one clock cycle in duration. As with burst mode devices and slow bursting devices, burst accesses to a fast bursting device may be either unbounded, as shown, or may be bounded.

Figure 4:
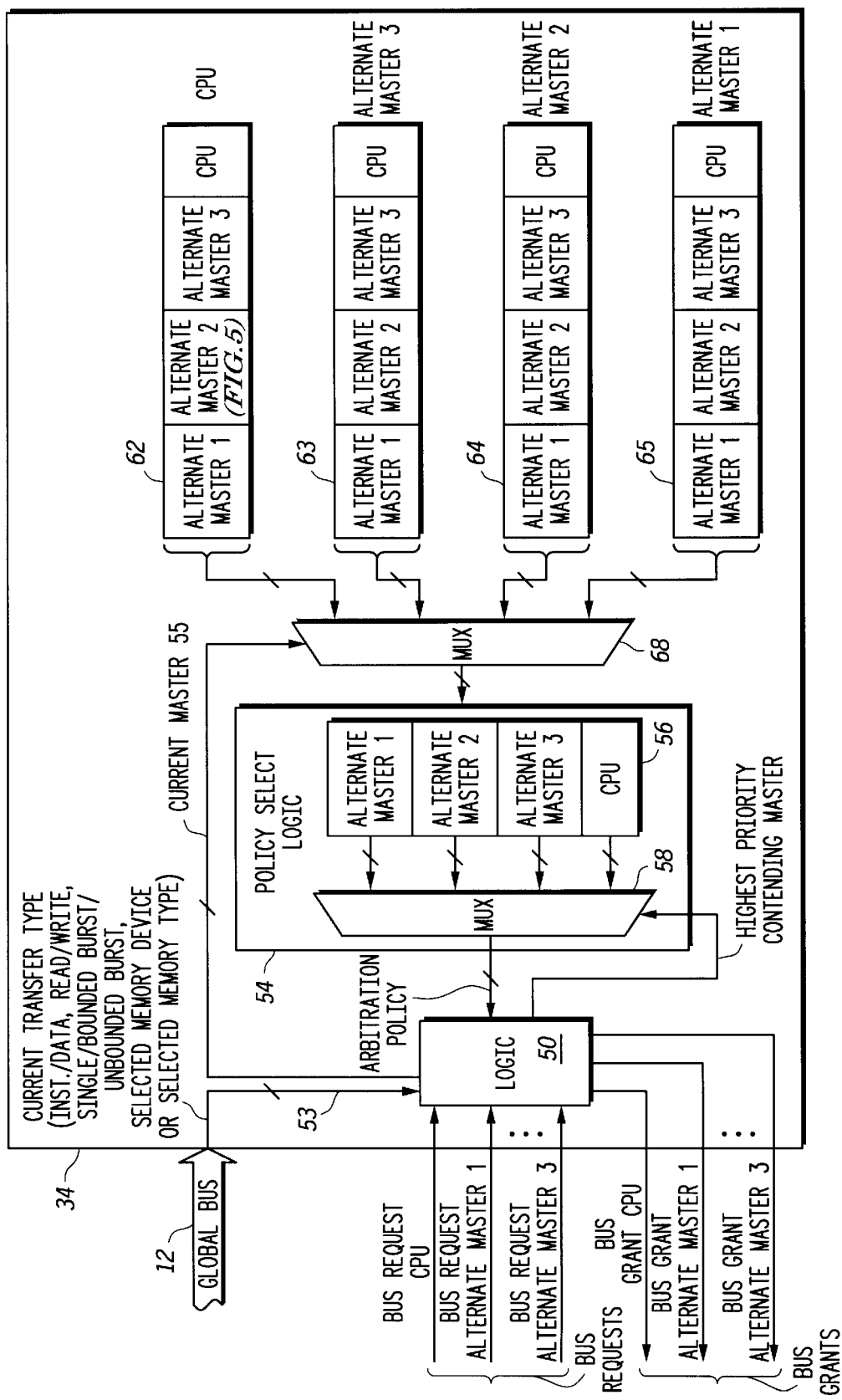
FIG. 4 illustrates in block diagram form an exemplary implementation of the bus arbiter of FIG. 1 in accordance with the present invention.

Illustrated in FIG. 4 is a detailed example of one implementation of Bus Arbiter 34 of FIG. 1 in accordance with the present invention. For convenience of understanding, all common elements between FIG. 1 and FIG. 4 are commonly numbered. A Logic Circuit 50 has a first input connected to the Global Bus 12 for receiving a Current Transfer Type signal. The Current Transfer Type Signals 53 may include a variety of information associated with the present or current transfer being communicated via Global Bus 12. Examples of types of information include, but are not limited to, information identifying whether Instruction (i.e. Program) information or Data information is currently being transferred by Global Bus 12. Other current transfer type information may include whether the current transfer is a read or a write transfer, whether the current transfer is a single transfer or a multiple burst, whether the current transfer is a bounded burst or an unbounded burst, what selected memory device is associated with the current transfer, and what type of memory device is associated with the current transfer. Logic Circuit 50 also has a plurality of Bus Request inputs for respectively receiving a Bus Request signal from each of CPU 14 and Alternate Bus Masters 36, 38 and 40. The Bus Request signals may be communicated either directly from (i.e. point-to-point) each of the requesting devices or may be communicated via the Global Bus 12. Logic Circuit 50 also has a plurality of Bus Grant outputs that are respectively connected to each of CPU 14 and Alternate Bus Masters 36, 38 and 40. A Policy Select Logic circuit 54 generates an Arbitration Policy signal that is connected to a second input of Logic Circuit 50. Policy Select Logic Circuit 54 has a Control Register 56 having a plurality of fields of predetermined bit width. In the illustrated form, Control Register 56 has fields associated with the first Alternate Bus Master 36, the second Alternate Bus Master 38, the third Alternate Bus Master 40 and the CPU 14. Each field of Control Register 56 is connected to an input of a Multiplexer (Mux) 58. An output of Multiplexer 58 is connected to the second input of Logic Circuit 50 for providing the Arbitration Policy signal. An output of Logic Circuit 50 is connected to a control input of Multiplexer 58 for selecting which field of Control Register 56 to utilize. Additional control registers, if desired, may be provided. As will be apparent from the following operational description, Control Registers 62–65 and Multiplexer 68 are optional circuitry and provide additional user options for establishing a burst arbitration protocol. Control Registers 62–65 are illustrated having a predetermined number of fields based on the number of alternate bus masters. In the illustrated form, there is an additional Control Register for each of the CPU 14 and Alternate Bus Masters 36, 38 and 40. In addition, each of Control Registers 62–65 has a field corresponding to the CPU and Alternate Bus Masters 36, 38 and 40. Each of Control Registers 62–65 is connected to a predetermined input of a Multiplexer (Mux) 68. An output of Multiplexer 68 is connected to Control Register 56 of the Policy Select Logic Circuit 54.

In operation, Bus Arbiter 34 functions to control which device within Data Processing System 10 is the master of (i.e. has rights to use) the Global Bus 12. Although Bus Arbiter 34 is shown as being separate and distinct within Data Processing System 10, it should be recognized that the bus arbitration function may be incorporated into CPU 14 or other portions of Data Processing System 10 without having a distinct module for performing bus arbitration. Bus Arbiter 34 uses information about a current transfer to make Global Bus 12 control decisions upon receipt of one or more bus requests to use Global Bus 12. When Logic Circuit 50 receives one or more bus requests from any of CPU 14 and Alternate Bus Masters 36, 38 and 40, a decision is made within Logic Circuit 50 based upon some predetermined criteria as to which bus request should be serviced first. In one form, the decision is made based upon a priority basis, but it should be well understood that other criteria not involving priorities may be used such as a round-robin selection. Logic Circuit 50 provides Multiplexer 58 with a signal indicating a Highest Priority Contending Master (i.e. corresponding to the bus request that has been selected for servicing), and Multiplexer 58 uses this signal to select the control field of Control Register 56 associated with this highest priority master. The control field of Control Register 56 is encoded with a user programmed or user controlled encoding (i.e. a control value) that determines the arbitration policy to be used by Bus Arbiter 34 for that particular requesting device. A user may create or cause the creation of the control value by using a signal or voltage at an integrated circuit pin of an integrated circuit controlled by the bus arbiter 34 or by the execution within data processing system 10 of a user-provided software instruction. Logic Circuit 50 then decodes the selected control field of Control Register 56 and determines whether the highest priority contending bus master within Data Processing System 10 will be granted bus ownership of Global Bus 12 during an outstanding burst transfer, or whether it must wait for completion of a burst transfer in progress. Logic Circuit 50 conditionally asserts the Bus Grant CPU signal or a Bus Grant signal for one of the requesting Alternate Bus Masters 36, 38 and 40 based on the Current Transfer Type Signals 53 and information contained in Control Register 56. If bus ownership is transferred to a master other than the one performing the current transfer (i.e. transfer master status from a present or current communication bus master), the current transfer is interrupted, and a previously asserted bus grant signal is negated in order to force the Global Bus 12 to be relinquished and thus allow the higher priority master to gain bus ownership during an on-going burst transfer. It should be understood that Control Register 56 may be user programmed to add great flexibility to a data processing system and the ability to customize interrupt bus latency. In particular, Control Register 56 may be programmed with specific bus arbitration policy encodings to be interpreted by Logic Circuit 50 by the use of specific input signals to predetermined integrated circuit pins of an I.C. embodying data processing system 10, or by other signals contained within Data Processing System 10. In the alternative, Control Register 56 may be user programmed under software instruction control or by other user programming techniques.

Illustrated in FIG. 5 is an exemplary encoding example that may be used for each control field within Control Register 56. There are many differing encodings that may be used and it should be well understood that the examples provided herein may be readily modified or expanded. Assume for purposes of illustration only that a three-bit encoding field is chosen thereby providing a total of eight different encodings. The encodings of FIG. 5 illustrate an arbitration policy that is based on whether bus control changes will be permitted during burst cycles, whether bus control changes will be permitted based upon the type of information being communicated (e.g. instruction or program information versus data information), whether bus control changes will be permitted based upon whether a read or write operation of a system memory is occurring, and whether bus control changes will be permitted based upon a whether a cache burst (i.e. a bounded burst) or a more general unbounded sequential burst transfer is occurring. Arbitration policy may be based on other factors or a combination of the characteristics described herein. Once it has been identified what type of current transfer is present on Global Bus 12, the Logic Circuit 50 can be constructed to optimally respond with a correct bus grant signal. For example, in certain embodiments of Data Processing System 10, if a cache burst is identified as currently being present on Global Bus 12, the cache burst should be allowed to complete prior to issuance of a bus grant signal that would change bus mastership. However, if a cache burst is not present, a bus grant signal may be issued due to the uncertain length associated with an unbounded sequential burst. Cache bursts are distinguished from unbounded sequential burst transfers since they have a limited and known length such as either four or eight beats, typically. Thus, the transfer time associated with cache bursts is bounded. Withholding bus grants to an alternate master during the limited interval of a cache line burst improves system performance by allowing optimal burst memory operation and by minimizing the number of stall cycles in CPUs with blocking caches.

Additionally, in some embodiments of Data Processing System 10, if a Read operation is occurring so that information from one of the system memories is being provided to CPU 14, that information is deemed to be important enough to avoid a potential stall of the CPU 14 to complete the burst transaction before a bus ownership change is permitted. However, if a Write operation is occurring, a change of bus mastership may occur in a particular system application without significantly degrading system performance. The present invention permits a user to be able to customize for a particular application rules associated with when communication bus ownership may be changed. Therefore, the rules just described within this paragraph may not always be applicable for all systems and the appropriate encodings may be programmed in Control Register 56 to optimize a particular system application.

In some special circumstances, the length of a cache line fill may exceed the maximum required latency of a time-critical alternate master. These masters require immediate access to the bus, and the frequency of this type of request is generally low. For this type of master, it is critical that any burst sequence be interrupted and then resumed, in spite of the lowered efficiency of the CPU requesting the burst and of the memory system being accessed. It is desirable to minimize the occurrence of burst interruptions in a system, and to limit burst interruptions to a restricted set of masters.

In one form, an encoding of 000 indicates that no bus ownership change is allowed during any cache burst cycle. This feature is advantageous for system design involving burst transfers. If a bus master is by definition not allowed to permit arbitration for a system bus when the bus master is bursting information, then that bus master does not need additional logic circuitry to be able to implement partial bursting. At the other extreme, an encoding of 111 indicates that a transfer of bus ownership is allowed during any burst cycle. An encoding of 001 indicates that a bus ownership change is allowed only during an instruction cache (I cache) burst cycle, or an unbounded burst transfer. That is, bus ownership is permitted only when the type of information on the bus is program information and the bursting is not unbounded, as it is cache bursting, or whenever an unbounded burst of any type is occurring. An encoding of 010 indicates that if a cache burst is occurring, a bus ownership change is allowed only during a data cache (D cache) burst read cycle. Therefore, three criteria are indicated with this encoding: (1) the information is data; (2) the burst is a cache burst; and (3) the transaction on the bus is a read transaction. An encoding of 011 indicates that a bus ownership change is allowed only during cache burst read cycles, or whenever an unbounded burst of any type is occurring. An encoding of 100 indicates that a bus ownership change is allowed only during cache burst write cycles, or whenever an unbounded burst of any type is occurring. An encoding of 101 indicates that a bus ownership change is allowed only during a data cache burst write cycle or an instruction cache burst cycle, or whenever an unbounded burst of any type is occurring. An encoding of 110 indicates that a bus ownership change is allowed only during a data cache burst cycle, or whenever an unbounded burst of any type is occurring. Therefore, the logic of Logic Circuit 50 is provided to recognize these stated restrictions as an arbitration policy when presented the specific values by the Policy Select Logic 54. Bus Arbiter 34 may implement at least two differing arbitration policies for burst transfers of information on the Global Bus 12 in response to the encoded control information. The variations provide a user with the ability to set a customized arbitration policy associated with burst transfers for each circuit module in a system that desires bus mastership and that has bus mastership granted under some predetermined selection scheme. It should be understood that the arbitration method associated with bursting information on a global data bus that is taught herein is separate from the algorithm used to select one of several requesting masters.

Illustrated in FIG. 6 is an encoding for fields within Control Register 56 that uses a field with two bits. An encoding of 00 indicates that no bus ownership change is permitted during burst cycles, whereas an encoding of 11 indicates that a transfer of bus ownership is allowed during any burst cycles. An encoding of 01 indicates that no bus ownership change is allowed during accesses to a burst mode device. An encoding of 10 indicates that no bus ownership change is allowed during accesses to a fast memory device. Therefore, by way of this example it is clear that a user may program an arbitration policy based upon whether a requesting device makes a requests at a time when the bus control resides with a transfer involving a DRAM or Flash versus when the transfer involves an SRAM.

Additionally, Control Registers 62–65 and Multiplexer 68 may be combined with Control Register 56 to provide selective control on a per bus master basis, and on a per type of burst basis. Since the types of burst transfers are typically directed to different devices, the characteristics of the device may also influence the protocol selection. Each of Control Registers 62–65 is correlated to a particular bus master and the control fields (i.e. burst arbitration policy) of each master in the system may be varied depending upon which bus master has current bus control and on which bus master is requesting bus control. Multiplexer 68 selects one of Control Registers 62–65 based on information provided by Current Master Signals 55. For each potential bus master, a selected one of Control Registers 62–65 is provided to Policy Select Logic 54, based on the currently active bus master. Policy Select Logic 54 may then use the control fields within the provided one of Control Registers 62–65 to determine the arbitration policy during the current bus master's bus tenure. Control Registers 62–65 may be programmed with information unique to each current bus master such that bus arbitration policies during the bus tenure of a particular bus master may be independently programmed relative to the bus tenures of all other masters. The selective control on a per master basis permits the burst arbitration policy to be altered on a master-to-master tenure basis and can be optimized by a user to further improve system performance.

By now it should be appreciated that there has been provided a method and system that uses a set of control bits in a register or other storage device or signaling mechanism to control how arbitration is handled during burst transfers. For each potential master in the system, a field of control information is provided that controls arbitration of the bus during burst transfers. Within the field, a control may be provided for each type of transfer such as an I cache fill, a D cache fill, a D cache copyback (write) etc. In an alternate embodiment, the control field contains control information corresponding to a selected device and the type of burst transfers supported by that device. During burst transfers, if an alternate master makes a request for the bus, the request is qualified by the type of transfer in progress and the corresponding setting of the associated control field.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific embodiments. However, one of ordinary skill in the art appreciates that various modifications and changes can be made without departing from the scope of the present invention as set forth in the claims below. For example, any type of memory and any type of cache may be used in connection with the present invention. Various bursting policies may be encoded depending upon the specific system. Control policy information may be provided via methods or structures other than the control register used in the foregoing description. Additionally, although only one bus master in a system may be capable of using burst transactions, the present invention may be utilized. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system having an apparatus for controlling use of a communication bus, comprising:

a plurality of communication bus masters, at least one of the plurality of communication bus masters being coupled to the communication bus for communicating information via the communication bus in burst cycles when made a bus master, and a bus arbiter coupled to the communication bus and in response to two of the plurality of communication bus masters wanting master control of the communication bus, the bus arbiter implementing an arbitration policy for selectively permitting sole access by one of the plurality of communication bus masters to the communication bus, the bus arbiter having user controlled circuitry for receiving control information that can reassign control of the communication bus at any time during a burst transfer of information by an existing one of the plurality of communication bus masters without waiting until an end of a presently existing burst communication on the communication bus to complete, the control information determining the arbitration policy based upon whether a type of burst transfer presently existing on the communication bus is a bounded burst or an unbounded burst.

2. The system of claim 1 wherein the control information that is received by the bus arbiter determines the arbitration policy based upon a burst type of a memory device that is responding to a burst transfer presently existing on the communication bus.

3. The system of claim 1 wherein the user controlled circuitry further comprise:

one or more registers for storing at least one predetermined control signal determined by a user, the predetermined control signal specifying the arbitration policy.

4. The system of claim 3 wherein the bus arbiter further comprises:

logic circuitry coupled to the one or more registers, the logic circuitry implementing the arbitration policy in response to both the at least one predetermined control signal and a predetermined characteristic of a current burst transfer being communicated by the communication bus.

5. A system having an apparatus for controlling use of a communication bus, comprising:

a plurality of communication bus masters, at least one of the plurality of communication bus masters being coupled to the communication bus for communicating information via the communication bus in burst cycles when made a bus master;

a bus arbiter coupled to the communication bus and in response to two of the plurality of communication bus masters wanting master control of the communication bus, the bus arbiter implementing an arbitration policy for selectively permitting sole access by one of the plurality of communication bus masters to the communication bus, the bus arbiter having user controlled circuitry for receiving control information that can reassign control of the communication bus at any time during a burst transfer of information by an existing one of the plurality of communication bus masters without waiting until an end of a presently existing burst communication on the communication bus to complete; and a memory coupled to the communication bus, wherein the arbitration policy between each of the plurality of communication bus masters is selected from one of multiple stored policies and is determined based upon whether the type of burst transfer presently existing on the communication bus is a read or a write of the memory.

6. A system having an apparatus for controlling use of a communication bus, comprising:

a plurality of communication bus masters, at least one of the plurality of communication bus masters being coupled to the communication bus for communicating information via the communication bus in burst cycles when made a bus master; and a bus arbiter coupled to the communication bus and in response to two of the plurality of communication bus masters wanting master control of the communication bus, the bus arbiter implementing an arbitration policy for selectively permitting sole access by one of the plurality of communication bus masters to the communication bus, the bus arbiter having user controlled circuitry for receiving control information that can reassign control of the communication bus at any time during a burst transfer of information by an existing one of the plurality of communication bus masters without waiting until an end of a presently existing burst communication on the communication bus to complete, wherein the control information that is used by the bus arbiter is selected from one of multiple stored policies based on which of the plurality of communication bus masters is a current bus master.

7. A system having an apparatus for controlling use of a communication bus, comprising:

a plurality of communication bus masters, at least one of the plurality of communication bus masters being coupled to the communication bus for communicating information via the communication bus in burst cycles when made a bus master; and a bus arbiter coupled to the communication bus and in response to two of the plurality of communication bus masters wanting master control of the communication bus, the bus arbiter implementing an arbitration policy for selectively permitting sole access by one of the plurality of communication bus masters to the communication bus, the bus arbiter having user controlled circuitry for receiving control information that can reassign control of the communication bus at any time during a burst transfer of information by an existing one of the plurality of communication bus masters without waiting until an end of a presently existing burst communication on the communication bus to complete, wherein the control information that is used by the bus arbiter is selected from one of multiple stored policies based on which of the plurality of communication bus masters is requesting control of the communication bus.

8. A system having an apparatus for controlling use of a communication bus, comprising:

a plurality of communication bus masters, at least one of the plurality of communication bus masters being coupled to the communication bus for communicating information via the communication bus in burst cycles when made a bus master; and a bus arbiter coupled to the communication bus and in response to two of the plurality of communication bus masters wanting master control of the communication bus, the bus arbiter implementing an arbitration policy for selectively permitting sole access by one of the plurality of communication bus masters to the communication bus, the bus arbiter having user controlled circuitry for receiving control information that can reassign control of the communication bus at any time during a burst transfer of information by an existing one of the plurality of communication bus masters without waiting until an end of a presently existing burst communication on the communication bus to complete wherein the control information determining the arbitration policy selected from one of multiple stored policies; and a plurality of registers, each of which is correlated with a predetermined one of the plurality of communication bus masters to dynamically and independently determine arbitration policy associated with all other of the plurality of communication bus masters when the predetermined one of the plurality of communication bus masters is master of the communication bus.

9. A method for controlling use of a communication bus in a system comprising:

providing a control value via a user controlled means to a bus arbiter, the control value selecting one of a predetermined plurality of arbitration policies during burst transfers of information for selecting bus mastership among a plurality of bus masters; and using the control value to select one of the plurality of bus masters based upon whether the present burst transfer is a bounded burst or an unbounded burst.

10. The method of claim 9 further comprising:

providing a status signal to the bus arbiter, the status signal containing current burst transfer type information that provides type information about a current burst transfer being communicated via the communication bus; and using both the control value and the status signal to selectively reassign control of the communication bus at any time during a present burst transfer of information by a current bus master without waiting until an end of the present burst transfer has completed.

11. The method of claim 9 further comprising:

using the control value to select one of the plurality of bus masters based upon a timing characteristic of a burst transfer presently being communicated on the communication bus.

12. The method of claim 9 further comprising:

storing the control value in a storage device that functions as the user controlled means, the storage device being controlled by a user either by using an integrated circuit pin or by executing a user-provided software instruction.

13. The method of claim 9 further comprising:

providing a plurality of user determined control signals, each of the plurality of user determined control signals separately determining arbitration policy for a predetermined one of the plurality of bus masters.

14. A method for controlling use of a communication bus in a system comprising:

coupling a bus arbiter to the communication bus;

coupling a memory to the communication bus; and providing a control value via a user controlled means to the bus arbiter, the control value selecting one of a predetermined plurality of arbitration policies for selecting bus mastership among a plurality of bus masters, wherein the control value can reassign control of the communication bus at any time during a burst transfer of information and determine interrupt permissions between the plurality of bus masters based upon whether a present burst transfer is a read of the memory or a write of the memory.

15. A method for controlling use of a communication bus in a system comprising:

providing a plurality of communication bus master, at least one of the plurality of communication bus masters being coupled to the communication bus for communicating information via the communication bus in burst cycles when made a bus master; and coupling a bus arbiter to the communication bus;

in response to two of the plurality of communication bus master wanting master control of the communication bus, implementing an arbitration policy for selectively permitting sole access by one of the plurality of communication bus masters to the communication bus;

receiving control information within user controlled circuitry that can reassign control of the communication bus at any time during a burst transfer of information by an existing one of the plurality of communication bus masters without waiting until an end of a presently existing burst communication on the communication bus to complete;

providing within the control information multiple arbitration policies; and selecting one of the multiple arbitration policies based upon which one of the plurality of communication bus masters is a current bus master of the communication bus.

16. A method for controlling use of a communication bus, comprising:

coupling a plurality of communication bus masters to the communication bus for communicating information via the communication bus in burst cycles when each of the plurality of communication bus masters is made a bus master;

in response to two of the plurality of communication bus master wanting master control of the communication bus, implementing an arbitration policy for selectively permitting sole access by one of the plurality of communication bus masters to the communication bus;

using control information that can reassign control of the communication bus at any time during a burst transfer of information by an existing one of the plurality of communication bus masters without waiting until an end of a presently existing burst communication on the communication bus to complete wherein the control information is selected from one of multiple stored arbitration policies based on which of the plurality of communication bus masters is requesting control of the communication bus.

* * * * *

UNITED STATES PATENT AND TRADEMARK OFFICE
CERTIFICATE OF CORRECTION

PATENT NO. : 6,775,727 B2  Page 1 of 1
APPLICATION NO. : 09/888278
DATED : August 10, 2004
INVENTOR(S) : William C. Moyer It is certified that error appears in the above-identified patent and that said Letters Patent is hereby corrected as shown below:

In Column 12, Line 5, Claim No. 14:
    Change "determine" to --determines--.

In Column 12, Line 11, Claim No. 15:
    Change "master" to --masters--.

In Column 12, Line 18, Claim No. 15:
    Change "master" to --masters--.

In Column 12, Line 43, Claim No. 16:
    Change "master" to --masters--.

Signed and Sealed this

Twenty-seventh Day of October, 2009

David J. Kappos
*Director of the United States Patent and Trademark Office*